US012604339B2

(12) United States Patent
Ma et al.

(10) Patent No.: US 12,604,339 B2
(45) Date of Patent: Apr. 14, 2026

(54) UPLINK TRANSMISSIONS WITH REPETITION DURING CONTENTION-FREE RANDOM ACCESS

(71) Applicant: QUALCOMM Incorporated, San Diego, CA (US)

(72) Inventors: Liangping Ma, San Diego, CA (US); Bharat Shrestha, San Diego, CA (US); Xiao Feng Wang, San Diego, CA (US); Umesh Phuyal, San Diego, CA (US); Alberto Rico Alvarino, San Diego, CA (US); Changhwan Park, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 18/353,506

(22) Filed: Jul. 17, 2023

(65) Prior Publication Data

US 2024/0155669 A1     May 9, 2024

Related U.S. Application Data

(60) Provisional application No. 63/382,479, filed on Nov. 4, 2022.

(51) Int. Cl.
*H04W 74/00* (2009.01)
*H04W 74/04* (2009.01)

(52) U.S. Cl.
CPC ......... *H04W 74/004* (2013.01); *H04W 74/04* (2013.01)

(58) Field of Classification Search
CPC ............... H04W 56/005; H04W 56/00; H04W 72/1268; H04W 74/0833; H04W 74/0841; H04W 74/0866; H04W 74/08; H04W 72/12; H04W 60/00; H04W 76/18; H04W 68/005; H04W 8/24; H04W 84/042; H04W 92/24; H04W 68/00; G01S 13/003; G01S 13/765; G01S 13/767; G01S 13/87;
(Continued)

(56) References Cited

U.S. PATENT DOCUMENTS 11,405,949 B2 *  8/2022  Takeda .................. H04W 76/10
12,010,540 B2 *  6/2024  Xiong .................. H04W 24/10
(Continued)

FOREIGN PATENT DOCUMENTS

| EP | 4521669 A2 * | 3/2025 | ........ H04W 74/0833 |
| EP | 4078826 B1 * | 7/2025 | ............ H04W 72/54 |
| EP | 4205459 B1 * | 7/2025 | ........ H04W 74/0833 |

*Primary Examiner* — Nathan S Taylor
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, a downlink communication that indicates a random access response (RAR) or a fallback RAR, the downlink communication being received during a contention-free random access (CFRA) involving the UE and the network node. The UE may transmit, to the network node and based at least in part on an uplink grant in the RAR or in the fallback RAR, an uplink transmission with a repetition, the uplink transmission with the repetition being transmitted during the CFRA involving the UE and the network node. Numerous other aspects are described.

30 Claims, 14 Drawing Sheets

400 ──▶

(58) Field of Classification Search
CPC . G01S 13/00; G01S 13/76; G01S 5/02; H04L
43/0864
See application file for complete search history.

(56) References Cited

U.S. PATENT DOCUMENTS

| | | | | |
|---|---|---|---|---|
| 12,120,745 | B2 * | 10/2024 | Takeda | H04W 8/26 |
| 2020/0314913 | A1 * | 10/2020 | Rastegardoost | H04W 56/0045 |
| 2022/0140947 | A1 * | 5/2022 | Takeda | H04L 1/1819 |
| | | | | 370/329 |
| 2022/0150975 | A1 * | 5/2022 | Agiwal | H04W 28/0278 |
| 2022/0210818 | A1 * | 6/2022 | Cirik | H04W 72/232 |
| 2022/0287103 | A1 * | 9/2022 | Cozzo | H04W 74/0833 |
| 2022/0338236 | A1 * | 10/2022 | Cirik | H04L 1/08 |
| 2023/0037319 | A1 * | 2/2023 | Taherzadeh Boroujeni | H04W 74/0841 |
| 2023/0247683 | A1 * | 8/2023 | Lin | H04W 74/0841 |
| | | | | 370/329 |
| 2023/0284279 | A1 * | 9/2023 | Zhou | H04W 74/0833 |
| | | | | 370/328 |
| 2023/0292373 | A1 * | 9/2023 | Chang | H04W 74/0833 |
| 2023/0363005 | A1 * | 11/2023 | Cirik | H04L 5/0053 |
| 2023/0363015 | A1 * | 11/2023 | Ko | H04W 74/0866 |
| 2024/0008073 | A1 * | 1/2024 | Taherzadeh Boroujeni | H04W 74/0838 |
| 2024/0080919 | A1 * | 3/2024 | Kuo | H04W 76/15 |
| 2024/0215015 | A1 * | 6/2024 | Su | H04L 5/1469 |
| 2024/0259088 | A1 * | 8/2024 | Rune | H04B 7/18532 |
| 2024/0406777 | A1 * | 12/2024 | Xiong | H04W 72/542 |
| 2025/0024510 | A1 * | 1/2025 | Wu | H04W 76/27 |
| 2025/0039942 | A1 * | 1/2025 | Kung | H04W 72/23 |
| 2025/0071816 | A1 * | 2/2025 | Oh | H04W 74/0833 |
| 2025/0071820 | A1 * | 2/2025 | Xiong | H04L 1/1861 |
| 2025/0106870 | A1 * | 3/2025 | Xiong | H04L 27/2636 |
| 2025/0202652 | A1 * | 6/2025 | Matsumura | H04W 72/04 |
| 2025/0294559 | A1 * | 9/2025 | Go | H04W 36/0072 |

* cited by examiner

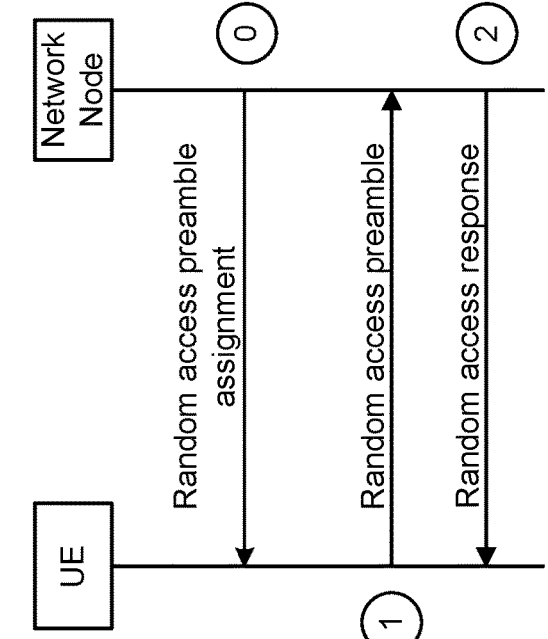
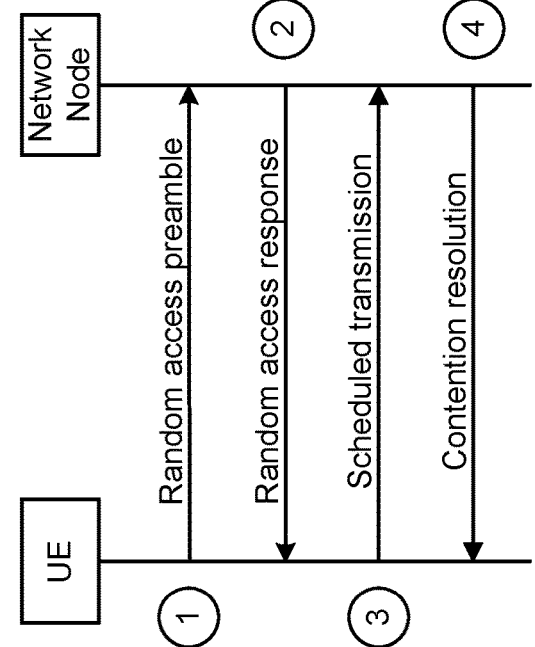
FIG. 6

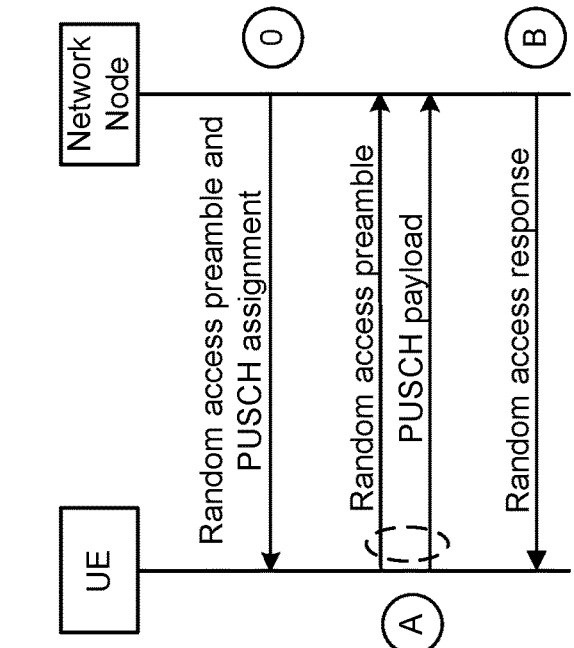
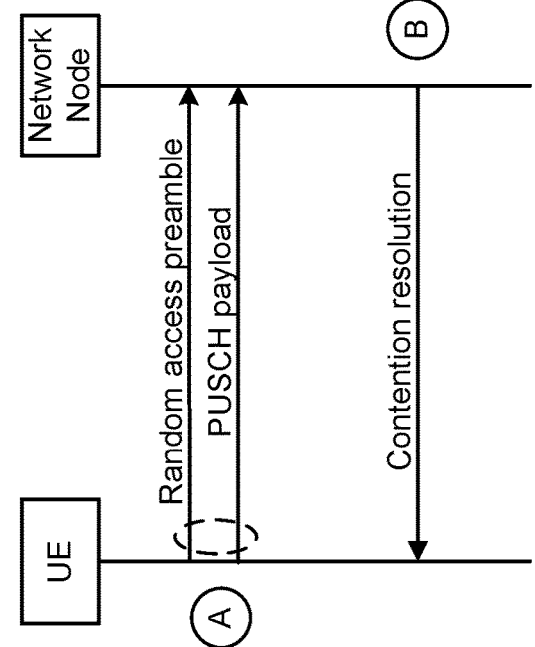
FIG. 7

800

900

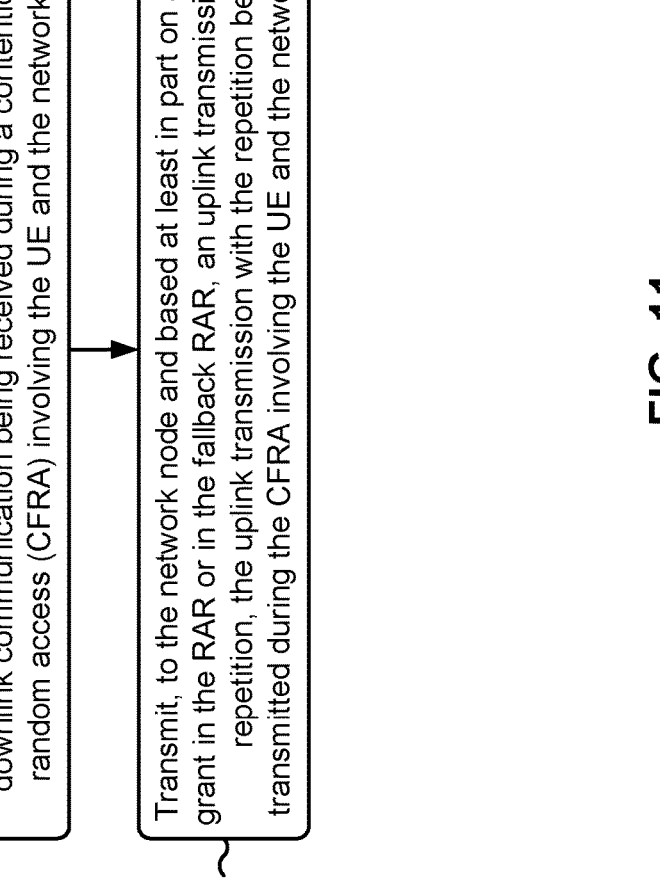

1110

Receive, from a network node, a downlink communication that indicates a random access response (RAR) or a fallback RAR, the downlink communication being received during a contention-free random access (CFRA) involving the UE and the network node

1120

Transmit, to the network node and based at least in part on an uplink grant in the RAR or in the fallback RAR, an uplink transmission with a repetition, the uplink transmission with the repetition being transmitted during the CFRA involving the UE and the network node

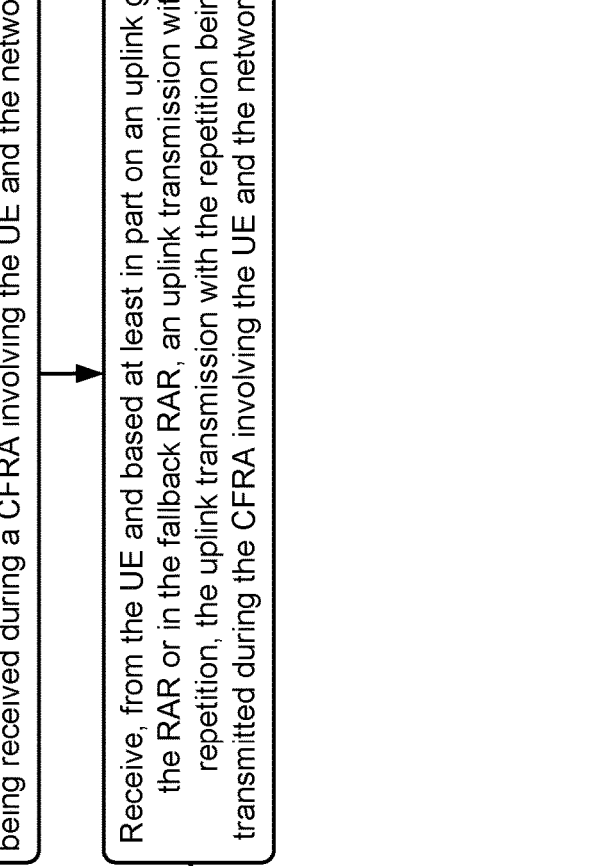

1210 — Transmit, to a user equipment (UE), a downlink communication that indicates an RAR or a fallback RAR, the downlink communication being received during a CFRA involving the UE and the network node 1220 — Receive, from the UE and based at least in part on an uplink grant in the RAR or in the fallback RAR, an uplink transmission with a repetition, the uplink transmission with the repetition being transmitted during the CFRA involving the UE and the network node

UPLINK TRANSMISSIONS WITH REPETITION DURING CONTENTION-FREE RANDOM ACCESS

CROSS-REFERENCE TO RELATED APPLICATION

This Patent Application claims priority to U.S. Provisional Patent Application No. 63/382,479, filed on Nov. 4, 2022, entitled "UPLINK TRANSMISSIONS WITH REPETITION DURING CONTENTION-FREE RANDOM ACCESS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for uplink transmissions with repetition during contention-free random access.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include one or more memories and one or more processors coupled to the one or more memories. The one or more processors individually or collectively may be configured to receive, from a network node, a downlink communication that indicates a random access response (RAR) or a fallback RAR, the downlink communication being received during a contention-free random access (CFRA) involving the UE and the network node. The one or more processors individually or collectively may be configured to transmit, to the network node and based at least in part on an uplink grant in the RAR or in the fallback RAR, an uplink transmission with a repetition, the uplink transmission with the repetition being transmitted during the CFRA involving the UE and the network node.

Some aspects described herein relate to an apparatus for wireless communication at a network node. The apparatus may include one or more memories and one or more processors coupled to the one or more memories. The one or more processors individually or collectively may be configured to transmit, to a UE, a downlink communication that indicates an RAR or a fallback RAR, the downlink communication being received during a CFRA involving the UE and the network node. The one or more processors individually or collectively may be configured to receive, from the UE and based at least in part on an uplink grant in the RAR or in the fallback RAR, an uplink transmission with a repetition, the uplink transmission with the repetition being transmitted during the CFRA involving the UE and the network node.

Some aspects described herein relate to a method of wireless communication performed by a UE. The method may include receiving, from a network node, a downlink communication that indicates an RAR or a fallback RAR, the downlink communication being received during a CFRA involving the UE and the network node. The method may include transmitting, to the network node and based at least in part on an uplink grant in the RAR or in the fallback RAR, an uplink transmission with a repetition, the uplink transmission with the repetition being transmitted during the CFRA involving the UE and the network node.

Some aspects described herein relate to a method of wireless communication performed by a network node. The method may include transmitting, to a UE, a downlink communication that indicates an RAR or a fallback RAR, the downlink communication being received during a CFRA involving the UE and the network node. The method may include receiving, from the UE and based at least in part on an uplink grant in the RAR or in the fallback RAR, an uplink transmission with a repetition, the uplink transmission with the repetition being transmitted during the CFRA involving the UE and the network node.

Some aspects described herein relate to a non-transitory computer-readable medium that stores a set of instructions for wireless communication by a UE. The set of instructions, when executed by one or more processors of the UE, may cause the UE to receive, from a network node, a downlink communication that indicates an RAR or a fallback RAR, the downlink communication being received during a CFRA involving the UE and the network node. The set of instructions, when executed by one or more processors of the UE, may cause the UE to transmit, to the network node and based at least in part on an uplink grant in the RAR or in the fallback RAR, an uplink transmission with a repetition, the uplink transmission with the repetition being transmitted during the CFRA involving the UE and the network node.

Some aspects described herein relate to a non-transitory computer-readable medium that stores a set of instructions for wireless communication by a network node. The set of instructions, when executed by one or more processors of the network node, may cause the network node to transmit, to a UE, a downlink communication that indicates an RAR or a fallback RAR, the downlink communication being received during a CFRA involving the UE and the network node. The set of instructions, when executed by one or more processors of the network node, may cause the network node to receive, from the UE and based at least in part on an uplink grant in the RAR or in the fallback RAR, an uplink transmission with a repetition, the uplink transmission with the repetition being transmitted during the CFRA involving the UE and the network node.

Some aspects described herein relate to an apparatus for wireless communication. The apparatus may include means for receiving, from a network node, a downlink communication that indicates an RAR or a fallback RAR, the downlink communication being received during a CFRA involving the apparatus and the network node. The apparatus may include means for transmitting, to the network node and based at least in part on an uplink grant in the RAR or in the fallback RAR, an uplink transmission with a repetition, the uplink transmission with the repetition being transmitted during the CFRA involving the apparatus and the network node.

Some aspects described herein relate to an apparatus for wireless communication. The apparatus may include means for transmitting, to a UE, a downlink communication that indicates an RAR or a fallback RAR, the downlink communication being received during a CFRA involving the UE and the apparatus. The apparatus may include means for receiving, from the UE and based at least in part on an uplink grant in the RAR or in the fallback RAR, an uplink transmission with a repetition, the uplink transmission with the repetition being transmitted during the CFRA involving the UE and the apparatus.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating examples of a four-step random access procedure, in accordance with the present disclosure.

FIG. 7 is a diagram illustrating examples of a two-step random access procedure, in accordance with the present disclosure.

FIGS. 11-12 are diagrams illustrating example processes associated with uplink transmissions with repetition during contention-free random access, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
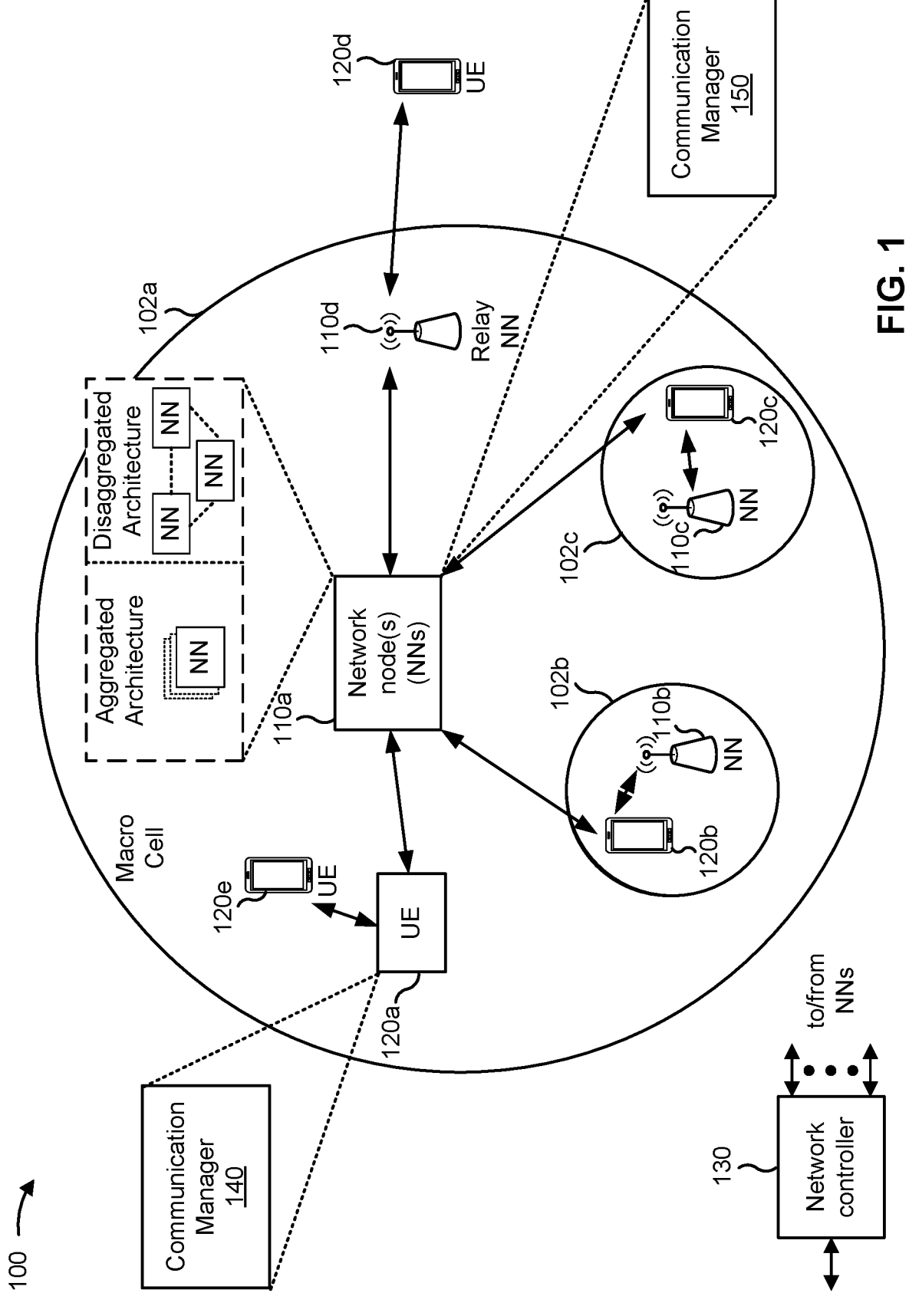
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network node, a downlink communication that indicates a random access response (RAR) or a fallback RAR, the downlink communication being received during a contention-free random access (CFRA) involving the UE and the network node; and transmit, to the network node and based at least in part on an uplink grant in the RAR or in the fallback RAR, an uplink transmission with a repetition, the uplink transmission with the repetition being transmitted during the CFRA involving the UE and the network node. Additionally, or alternatively, the communication manager 140 may perform one or more other operations described herein.

In some aspects, a network node (e.g., network node 110) may include a communication manager 150. As described in more detail elsewhere herein, the communication manager 150 may transmit, to a UE, a downlink communication that indicates an RAR or a fallback RAR, the downlink communication being received during a CFRA involving the UE and the network node; and receive, from the UE and based at least in part on an uplink grant in the RAR or in the fallback RAR, an uplink transmission with a repetition, the uplink transmission with the repetition being transmitted during the CFRA involving the UE and the network node. Additionally, or alternatively, the communication manager 150 may perform one or more other operations described herein.

As indicated above, FIG. 1 is provided as an example. Other examples may differ from what is described with regard to FIG. 1.

Figure 2:
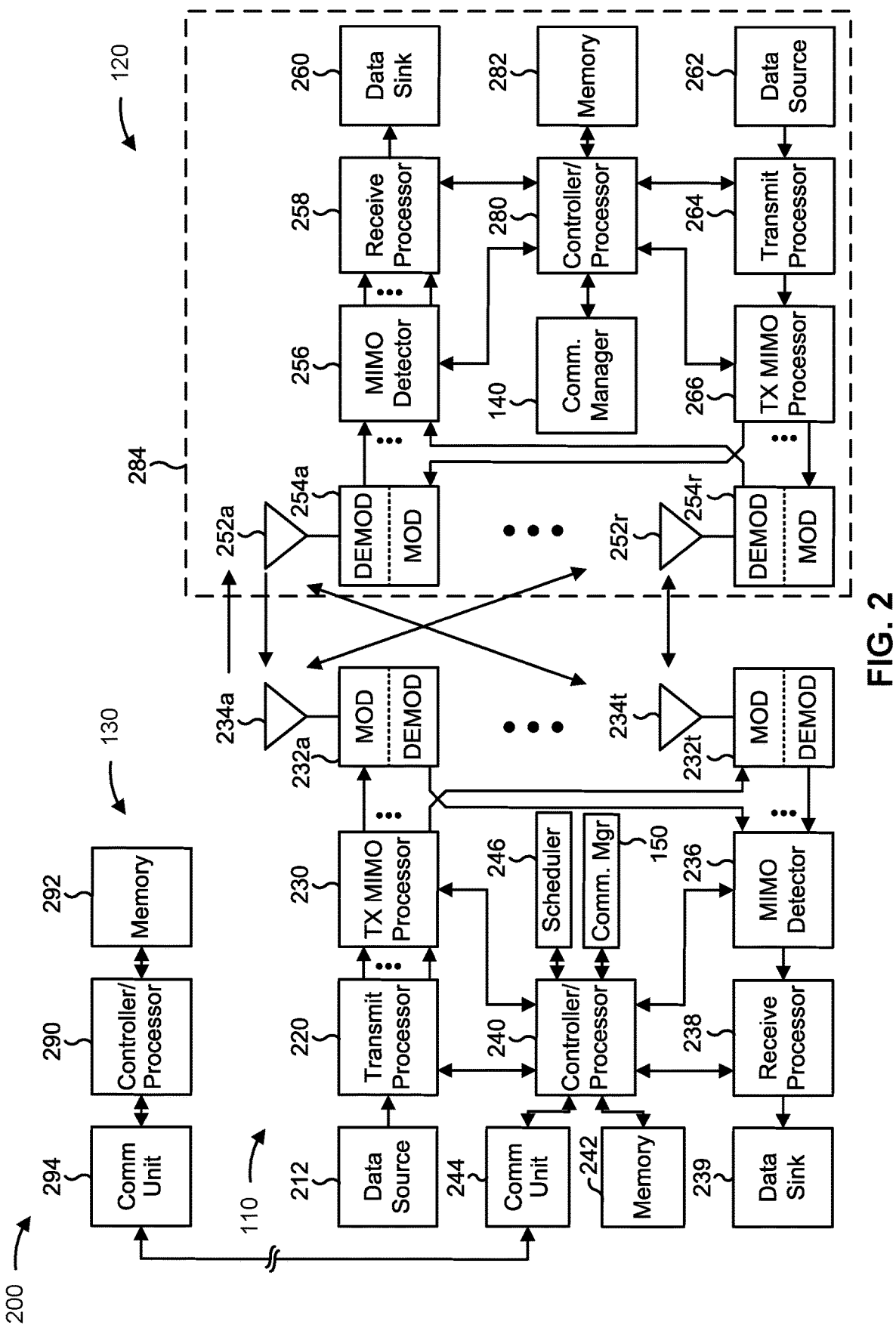
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller

130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-14).

The controller/processor 240 of the network node 110, the controller/processor 280 of the UE 120, and/or any other component(s) of FIG. 2 may perform one or more techniques associated with uplink transmissions with repetition during contention-free random access, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network node, a downlink communication that indicates an RAR or a fallback RAR, the downlink communication being received during a CFRA involving the UE and the network node; and/or means for transmitting, to the network node and based at least in part on an uplink grant in the RAR or in the fallback RAR, an uplink transmission with a repetition, the uplink transmission with the repetition being transmitted during the CFRA involving the UE and the network node. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for transmitting, to a UE, a downlink communication that indicates an RAR or a fallback RAR, the downlink communication being received during a CFRA involving the UE and the network node; and/or means for receiving, from the UE and based at least in part on an uplink grant in the RAR or in the fallback RAR, an uplink transmission with a repetition, the repetition being transmitted during the CFRA involving the UE and the network node. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
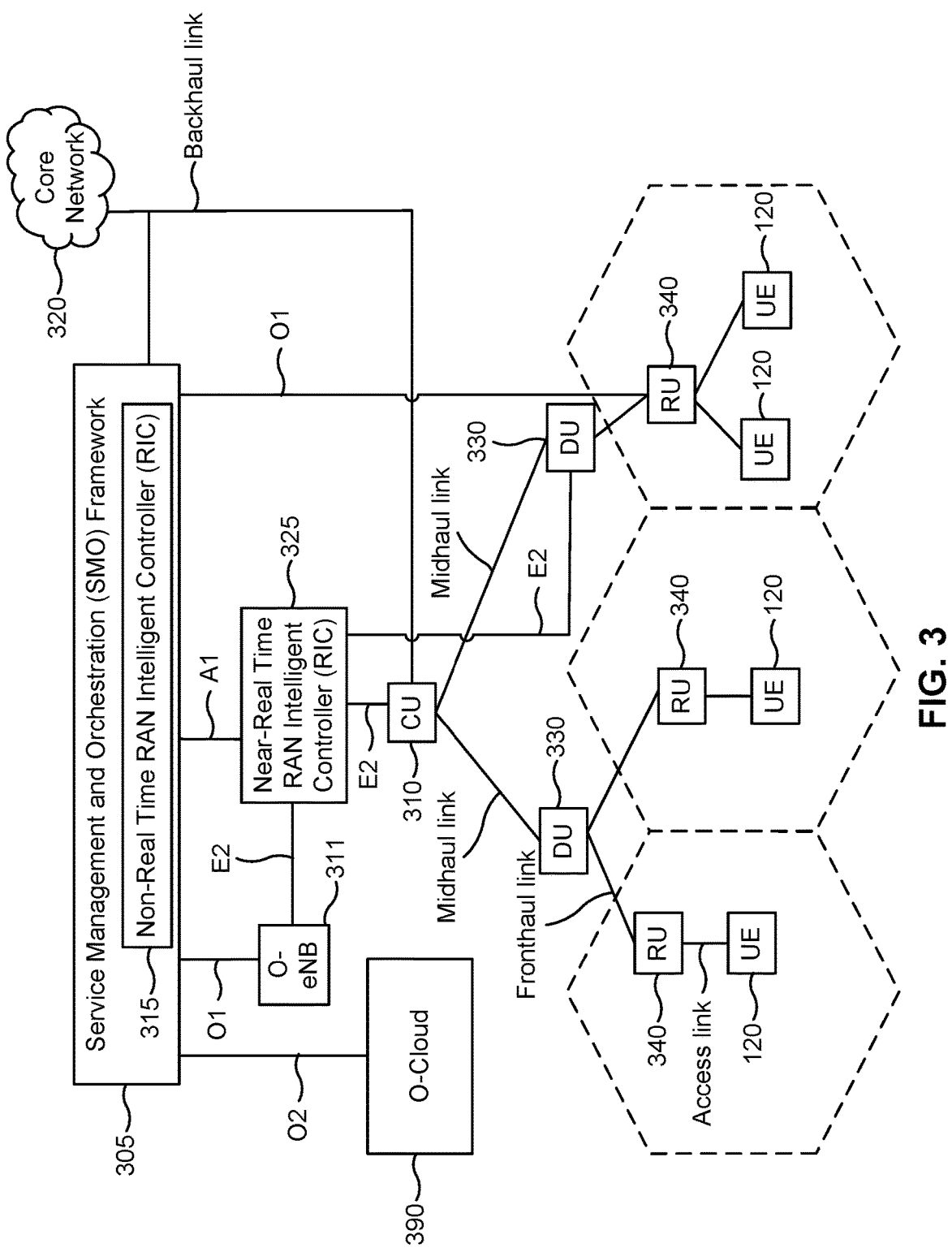
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
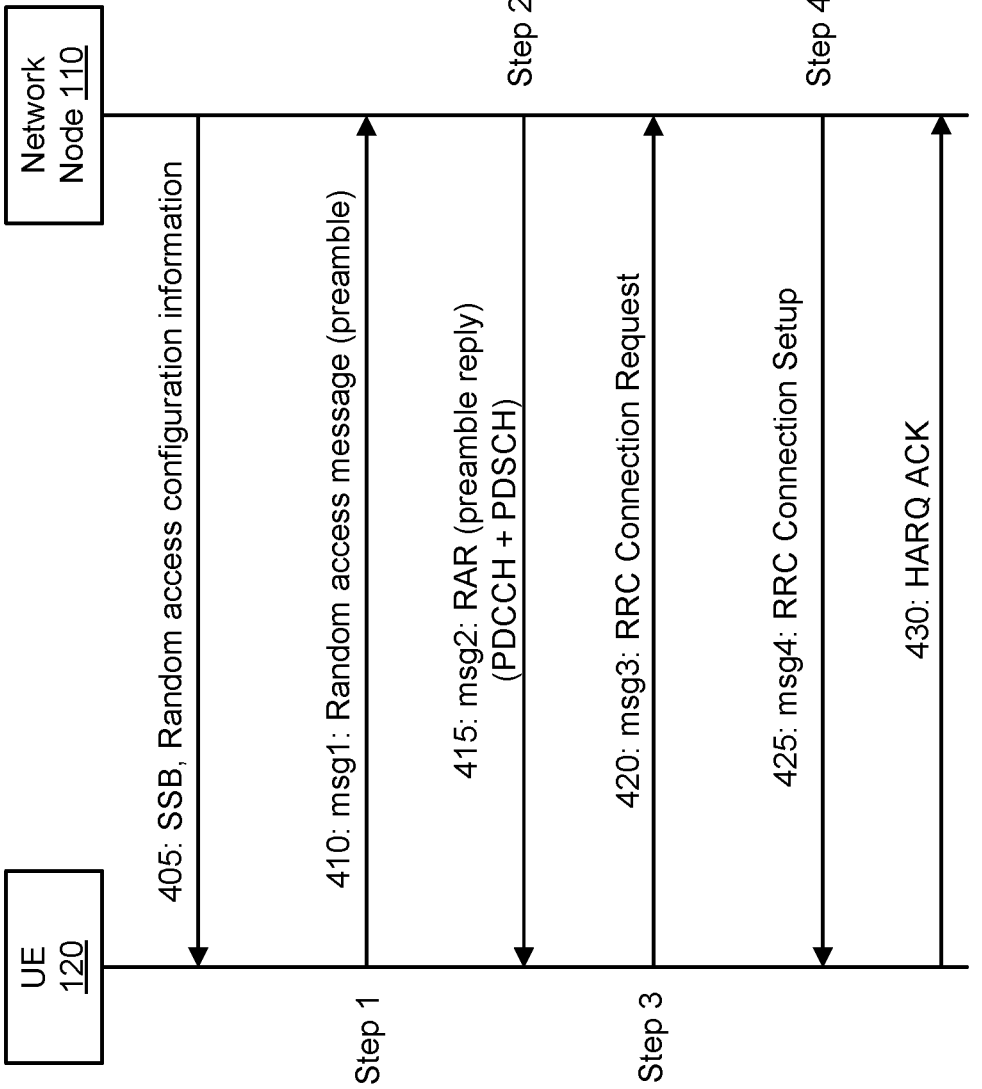
FIG. 4 is a diagram illustrating an example of a four-step random access procedure, in accordance with the present disclosure.

FIG. 4 is a diagram illustrating an example 400 of a four-step random access procedure, in accordance with the present disclosure. As shown in FIG. 4, a network node 110 and a UE 120 may communicate with one another to perform the four-step random access procedure.

As shown by reference number 405, the network node 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access (CBRA). Additionally, or alternatively, the random access configuration information may be transmitted in an RRC message and/or a physical downlink control channel (PDCCH) order message that triggers a random access channel (RACH) procedure, such as for CFRA. The random access configuration information may include one or more parameters to be used in the random access procedure, such as one or more parameters for transmitting a RAM and/or one or more parameters for receiving an RAR.

As shown by reference number 410, the UE 120 may transmit a random access message (RAM), which may include a preamble (sometimes referred to as a random access preamble, a PRACH preamble, or a RAM preamble). The message that includes the preamble may be referred to as a message 1, Msg1, a first message, or an initial message in a four-step random access procedure. The random access message may include a random access preamble identifier.

As shown by reference number 415, the network node 110 may transmit an RAR as a reply to the preamble. The message that includes the RAR may be referred to as message 2, Msg2, or a second message in a four-step random access procedure. In some aspects, the RAR may indicate the detected random access preamble identifier (e.g., received from the UE 120 in Msg1). Additionally, or alternatively, the RAR may indicate a resource allocation to be used by the UE 120 to transmit message 3 (Msg3).

In some aspects, as part of the second step of the four-step random access procedure, the network node 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation for the PDSCH communication. Also as part of the second step of the four-step random access procedure, the network node 110 may transmit the PDSCH communication for the RAR, as scheduled by the PDCCH communication. The RAR may be included in a MAC protocol data unit (PDU) of the PDSCH communication.

As shown by reference number 420, the UE 120 may transmit an RRC connection request message. The RRC connection request message may be referred to as message 3, Msg3, or a third message of a four-step random access procedure. In some aspects, the RRC connection request may include a UE identifier, uplink control information (UCI), and/or a physical uplink shared channel (PUSCH) communication (e.g., an RRC connection request).

As shown by reference number 425, the network node 110 may transmit an RRC connection setup message. The RRC connection setup message may be referred to as message 4, Msg4, or a fourth message of a four-step random access procedure. In some aspects, the RRC connection setup message may include the detected UE identifier, a timing advance value, and/or contention resolution information. As shown by reference number 430, if the UE 120 successfully receives the RRC connection setup message, the UE 120 may transmit a hybrid automatic repeat request (HARQ) acknowledgement (ACK).

As indicated above, FIG. 4 is provided as an example. Other examples may differ from what is described with regard to FIG. 4.

Figure 5:
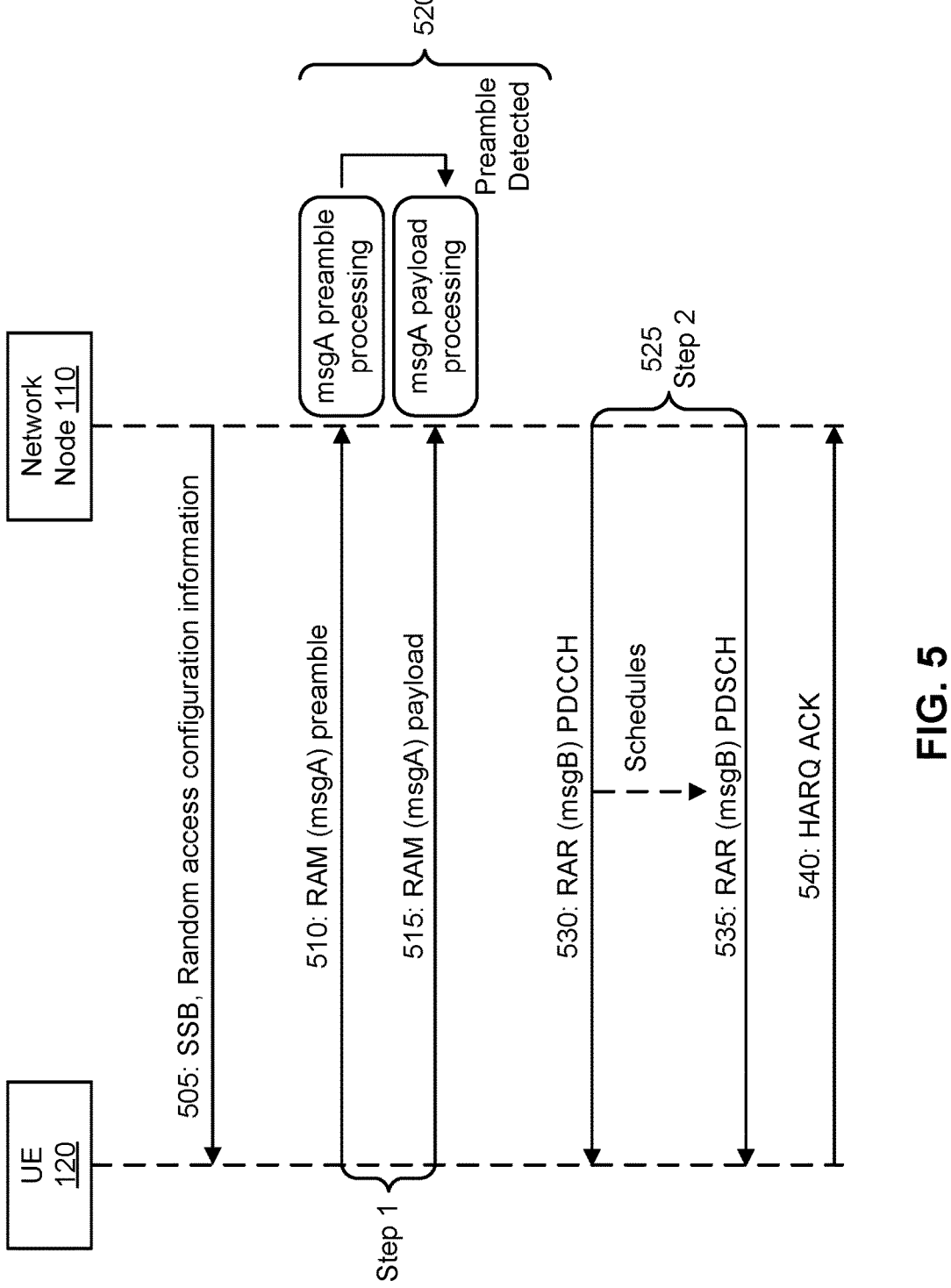
FIG. 5 is a diagram illustrating an example of a two-step random access procedure, in accordance with the present disclosure.

FIG. 5 is a diagram illustrating an example 500 of a two-step random access procedure, in accordance with the present disclosure. As shown in FIG. 5, a network node 110 and a UE 120 may communicate with one another to perform the two-step random access procedure.

As shown by reference number 505, the network node 110 may transmit, and the UE 120 may receive, one or more synchronization signal blocks (SSBs) and random access configuration information. In some aspects, the random access configuration information may be transmitted in and/or indicated by system information (e.g., in one or more SIBs) and/or an SSB, such as for CBRA. Additionally, or alternatively, the random access configuration information may be transmitted in an RRC message and/or a PDCCH order message that triggers a RACH procedure, such as for CFRA. The random access configuration information may include one or more parameters to be used in the two-step random access procedure, such as one or more parameters for transmitting a RAM and/or receiving an RAR to the RAM.

As shown by reference number 510, the UE 120 may transmit, and the network node 110 may receive, a RAM preamble. As shown by reference number 515, the UE 120 may transmit, and the network node 110 may receive, a RAM payload. As shown, the UE 120 may transmit the RAM preamble and the RAM payload to the network node 110 as part of an initial (or first) step of the two-step random access procedure. In some aspects, the RAM may be referred to as message A, MsgA, a first message, or an initial message in a two-step random access procedure. Furthermore, in some aspects, the RAM preamble may be referred to as a message A preamble, a MsgA preamble, a preamble, or a PRACH preamble, and the RAM payload may be referred to as a message A payload, a MsgA payload, or a payload. In some aspects, the RAM may include some or all of the contents of message 1 (Msg1) and message 3 (Msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, UCI, and/or a PUSCH transmission).

As shown by reference number 520, the network node 110 may receive the RAM preamble transmitted by the UE 120. If the network node 110 successfully receives and decodes the RAM preamble, the network node 110 may then receive and decode the RAM payload.

As shown by reference number 525, the network node 110 may transmit an RAR (sometimes referred to as an RAR message). As shown, the network node 110 may transmit the RAR message as part of a second step of the two-step random access procedure. In some aspects, the RAR message may be referred to as message B, MsgB, or a second message in a two-step random access procedure. The RAR message may include some or all of the contents of message 2 (Msg2) and message 4 (Msg4) of a four-step random access procedure. For example, the RAR message may include the detected PRACH preamble identifier, the detected UE identifier, a timing advance value, and/or contention resolution information.

As shown by reference number 530, as part of the second step of the two-step random access procedure, the network node 110 may transmit a PDCCH communication for the RAR. The PDCCH communication may schedule a PDSCH communication that includes the RAR. For example, the PDCCH communication may indicate a resource allocation (e.g., in downlink control information (DCI)) for the PDSCH communication.

As shown by reference number 535, as part of the second step of the two-step random access procedure, the network node 110 may transmit the PDSCH communication for the RAR, as scheduled by the PDCCH communication. The RAR may be included in a MAC PDU of the PDSCH communication. As shown by reference number 540, if the UE 120 successfully receives the RAR, the UE 120 may transmit a HARQ ACK.

As indicated above, FIG. 5 is provided as an example. Other examples may differ from what is described with regard to FIG. 5.

FIG. 6 is a diagram illustrating examples 600 of a four-step random access procedure, in accordance with the present disclosure. As shown in FIG. 6, a network node (e.g., network node 110) and a UE (e.g., UE 120) may communicate with one another to perform the four-step random access procedure.

As shown by reference number 602, in a CBRA with a four-step random access type, the UE may transmit, to the network node, a random access preamble in Msg1. The network node may transmit, to the UE, a random access response in Msg2. The UE may transmit, to the network node, a scheduled transmission in Msg3. The network node may transmit, to the UE, a contention resolution in Msg4.

As shown by reference number 604, in a CFRA with a four-step random access type, the network node may transmit, to the UE, a random access preamble assignment in Msg0. The UE may transmit, to the network node, a random access preamble in Msg1. The network node may transmit, to the UE, a random access response in Msg2.

As indicated above, FIG. 6 is provided as an example. Other examples may differ from what is described with regard to FIG. 6.

FIG. 7 is a diagram illustrating examples 700 of a two-step random access procedure, in accordance with the present disclosure. As shown in FIG. 7, a network node (e.g., network node 110) and a UE (e.g., UE 120) may communicate with one another to perform the two-step random access procedure.

As shown by reference number 702, in a CBRA with a two-step random access type, the UE may transmit, to the network node, a random access preamble and a PUSCH payload in MsgA. The network node may transmit, to the UE, a contention resolution in MsgB.

As shown by reference number 704, in a CFRA with a two-step random access type, the network node may transmit, to the UE, a random access preamble and PUSCH assignment in Msg0. The UE may transmit, to the network node, a random access preamble and a PUSCH payload in MsgA. The network node may transmit, to the UE, a random access response in MsgB.

As indicated above, FIG. 7 is provided as an example. Other examples may differ from what is described with regard to FIG. 7.

In CBRA, a repetition for Msg3 may be supported for a coverage enhancement. A UE may indicate its capability and the need for Msg3 repetition via a RACH preamble selection or a RACH occasion selection. A network node may configure a quantity of repetitions (e.g., a repetition factor) from a set of SIB-signaled values by repurposing two most significant bits of an MCS field in an RAR uplink grant for Msg3 initial transmission, or in a DCI 0_0 for Msg3 retransmission. The network node may transmit the RAR uplink grant to the UE.

In CFRA, a network node may transmit, to a UE, an RAR uplink grant in a Msg2 (e.g., a random access response), which may schedule a PUSCH transmission. The UE may transmit, to the network node, the PUSCH transmission based at least in part on the RAR uplink grant. The PUSCH transmission may be a CFRA Msg3 transmission. CFRA Msg3 scenarios may be associated with a PDCCH order, beam failure recovery (BFR), and/or handover. In some cases, the CFRA Msg3 transmission may need repetition (e.g., due to poor channel conditions). However, the network node and/or the UE may not be configured for CFRA Msg3 repetition. As a result, CFRA Msg3 transmissions may not be successfully received by the network, thereby degrading a performance of the UE.

In various aspects of techniques and apparatuses described herein, a UE may receive, from a network node, a downlink communication that indicates an RAR or a fallback RAR. The UE may receive the downlink communication during a CFRA involving the UE and the network node. The UE may transmit, to the network node and based at least in part on an uplink grant in the RAR or in the fallback RAR, an uplink transmission with a repetition. The UE may transmit the uplink transmission during the CFRA involving the UE and the network node. The uplink transmission may be associated with a CFRA Msg3 based at least in part on the CFRA being a four-step CFRA. The uplink transmission may be associated with a MsgA PUSCH retransmission in fallback (or Msg3) based at least in part on the CFRA being a two-step CFRA. As a result, the UE may support a CFRA Msg3 repetition, which may improve a performance of the UE during various CFRA Msg3 scenarios involving a PDCCH order, BFR, and/or handover.

Figure 8:
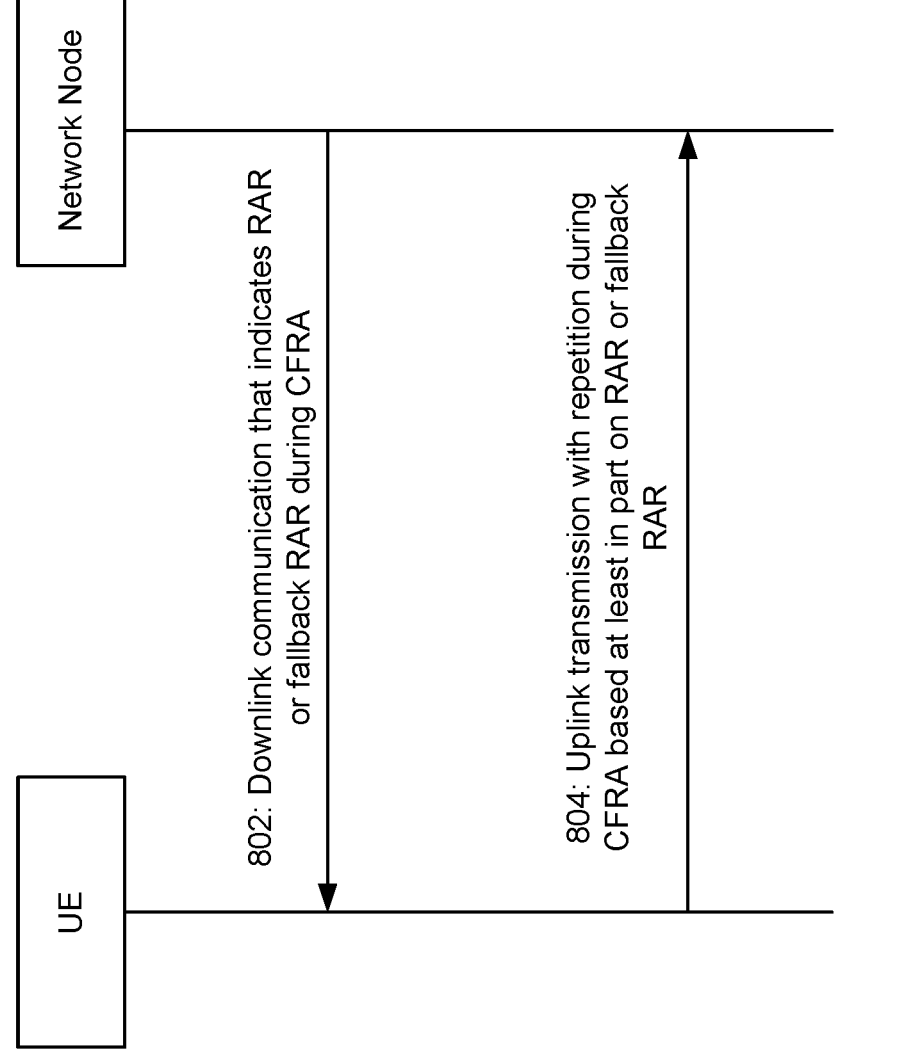
FIGS. 8-10 are diagrams illustrating examples associated with uplink transmissions with repetition during contention-free random access, in accordance with the present disclosure.

FIG. 8 is a diagram illustrating an example 800 associated with uplink transmissions with repetition during contention-free random access, in accordance with the present disclosure. As shown in FIG. 8, example 800 includes communication between a UE (e.g., UE 120) and a network node (e.g., network node 110). In some aspects, the UE and the network node may be included in a wireless network, such as wireless network 100.

As shown by reference number 802, the UE may receive, from the network node, a downlink communication that indicates an RAR or a fallback RAR. The UE may receive the downlink communication during a CFRA involving the UE and the network node. The downlink communication that indicates the RAR or the fallback RAR may be a PDSCH communication. A downlink communication that indicates an RAR may be a Msg2 of a four-step RACH (or four-step CFRA). A downlink communication that indicates a fallback RAR may be a MsgB of a two-step RACH (or two-step CFRA).

As shown by reference number 804, the UE may transmit, to the network node and based at least in part on an uplink grant in the RAR or in the fallback RAR, an uplink transmission with a repetition. The RAR or the fallback RAR may indicate the uplink grant, which the UE may use to transmit the uplink transmission with the repetition. The UE may transmit the uplink transmission with the repetition during the CFRA involving the UE and the network node. The uplink transmission with the repetition may be a PUSCH transmission with repetition. The UE may transmit the uplink transmission in accordance with a repetition factor, which may define a number of times that the uplink transmission is repeated. The uplink transmission may be a Msg3 of the four-step RACH. Alternatively, the uplink transmission may be a MsgA uplink retransmission of the two-step RACH. The UE may support a CFRA Msg3 repetition, which may improve a performance of the UE during various CFRA Msg3 scenarios involving a PDCCH order, BFR, and/or handover.

In some aspects, the repetition of the uplink transmission in the CFRA may correspond to a repetition of an uplink transmission in a prior CBRA between the UE and the network node, which may be based at least in part on the RAR or the fallback RAR associated with the CFRA being interpreted similarly as an RAR associated with the CBRA.

In some aspects, the repetition of a CFRA Msg3 in the four-step RACH or a CFRA Msg3 in a two-step RACH fallback may be linked to the repetition of a prior CBRA Msg3. The UE may use the same repetition (e.g., the same repetition factor) for the CFRA Msg3 in the four-step RACH as was previously used for the prior CBRA Msg3. The UE may interpret the RAR (e.g., an MCS field of an RAR uplink grant) or the fallback RAR in CFRA in the same manner as the RAR in a prior four-step RACH CBRA (if any). In some aspects, the UE may interpret the RAR or the fallback RAR in CFRA in the same manner as the RAR in the prior four-step RACH CBRA based at least in part on a predefined specification (e.g., such linking may be used when specified, but not used when not specified). Alternatively, the UE may interpret the RAR or the fallback RAR in CFRA in the same manner as the RAR in the prior four-step RACH CBRA based at least in part on signaling from the network node in a SIB. For example, the network node may indicate, to the UE, whether such linking is to be used or not.

In some cases, a delay between the CBRA Msg3 (e.g., the prior CBRA Msg3) and the CFRA Msg 3 may be relatively large, and the situation justifying the use of Msg3 repetition or the use of no Msg3 repetition may have changed. For example, the CBRA may not have needed Msg3 repetition so the UE did not make such a request, but the CFRA may need Msg3 repetition (e.g., due to a deterioration in channel conditions). As another example, the CBRA may have needed Msg3 repetition so the UE made such a request, but the CFRA may not need Msg3 repetition (e.g., due to an improvement in channel conditions).

In some aspects, the UE may transmit, to the network node, an uplink transmission repetition capability that indicates a UE capability for repeating the uplink transmission. The RAR or the fallback RAR may be interpreted for uplink transmission repetition based at least in part on the uplink transmission repetition capability signaled to the network node. Depending on the interpretation of the RAR or the fallback RAR, the UE may be able to determine whether repetition is enabled for the uplink transmission, and if repetition is enabled, a specific repetition factor to be associated with the uplink transmission.

In some aspects, the UE may interpret (e.g., always interpret) the RAR or the fallback RAR for CFRA Msg 3 repetition. The UE may interpret the RAR (e.g., an MCS field of an RAR uplink grant) that schedules the CFRA Msg3 for Msg3 repetition, when the UE has reported a Msg3 repetition capability. The UE may report the Msg3 repetition capability using an existing capability field (e.g., pusch-RepetitionCRC-r17), a new capability field, or a new information element (IE). The UE may have entered an RRC connected mode and may be able to report its capability, which may include pusch-RepetitionCRC-r17, the new capability field, or the new ID, which may indicate support of the CFRA Msg3 (scheduled by the RAR uplink grant). For example, regarding a repetition of a PUSCH transmission scheduled by the RAR uplink grant, a pusch-RepetitionCRC-r17 may be supported. In some cases, the UE may be capable of repeating the CFRA Msg3, but depending on a channel condition, the UE may not need to repeat the CFRA Msg3.

In some aspects, the UE may receive, from the network node, an indication associated with interpreting the RAR or the fallback RAR. The indication may indicate whether the RAR (e.g., an MCS field of a RAR uplink grant) may be interpreted for PUSCH repetition or not for PUSCH repetition. The indication may indicate whether the fallback RAR (e.g., an MCS field of a fallback RAR uplink grant) may be interpreted for PUSCH repetition or not for PUSCH repetition. The indication may be an explicit indication that indicates the repetition factor to be associated with the uplink transmission that is based at least in part on the RAR or the fallback RAR. In other words, the indication may explicitly indicate the repetition factor to be applied to the uplink transmission. The UE may receive the indication in a Msg2 of the four-step RACH. Alternatively, the UE may receive the indication in a MsgB of the two-step RACH.

In some aspects, the UE may receive the indication using reserved bits in a scheduling DCI in the RAR or in the fallback RAR. In some aspects, the UE may receive the indication using reserved bits in a channel state information (CSI) request bit in the RAR or in the fallback RAR. In some aspects, the UE may receive the indication using reserved bits in a PDCCH order based at least in part on the uplink transmission with the repetition being a PDCCH order initiated uplink transmission. In some aspects, the UE may receive the indication in a handover command based at least in part on a CFRA-based handover involving the UE.

In some aspects, the network node may explicitly indicate, to the UE, an interpretation of the RAR or the fallback RAR (e.g., an MCS field of the RAR or the fallback RAR), by using certain bits or fields in a scheduling DCI, in the RAR or the fallback RAR, or in the handover command (in the case of handover). In other words, the network node may explicitly indicate, to the UE, whether the UE should apply the CFRA Msg3 repetition, and if so, the repetition factor (e.g., the number of times that Msg3 should be repeated). Depending on the bits or fields in the scheduling DCI, in the RAR or the fallback RAR, or in the handover command, the UE may interpret the RAR or the fallback RAR as being associated with Msg3 repetition or no Msg3 repetition. In other words, the UE may determine whether to transmit Msg3 with repetition or with no repetition using the uplink grant indicated by the RAR or the fallback RAR, depending on the explicit indication.

In some aspects, the network node may use reserved bits in the scheduling DCI associated with the RAR or the fallback RAR in order to explicitly indicate the CFRA Msg3 repetition. For example, the network node may use up to 16 reserved bits in a DCI 1_0 scrambled with a random access radio network temporary identifier (RA-RNTI) scheduling a Msg2 (RAR) in CFRA. As another example, the network node may use (16-A) reserved bits in a DCI 1_0 scrambled with a MsgB radio network temporary identifier (RNTI) scheduling the fallback RAR, where A is the number of bits for a field "LSBs of SFN" (least significant bits of a system frame number) in the DCI 1_0, which may be applicable to the two-step RACH falling back to the four-step RACH. In some aspects, the network node may use a CSI request bit (a reserved bit) in the RAR or the fallback RAR in order to explicitly indicate the CFRA Msg3 repetition. In some aspects, the network node may use reserved bits (e.g., 10 bits available) in the PDCCH order (which may be a DCI 1_0 scrambled with a cell radio network temporary identifier (C-RNTI)) in the case of a PDCCH order initiated CFRA Msg3 transmission. The network node may use the reserved bits in the PDCCH order for explicitly indicating the CFRA Msg3 repetition. In some aspects, the network node may use a new IE in the handover command in the case of CFRA based handover. Alternatively, for handover, the handover command may indicate the number of repetitions for CFRA Msg3, and the UE may interpret the RAR in the same way as the UE interprets no CFRA Msg3 repetitions. In some aspects, the reserved bits in the scheduling DCI and the CSI request bit may be available for the explicit indication in various scenarios, such as PDCCH order, BFR, and/or handover.

In some aspects, the UE may transmit the uplink transmission with the repetition during a BFR based at least in part on a configured PRACH resource for the BFR being associated with a subset of PRACH resources reserved for indicating a CBRA uplink transmission request or capability. In some aspects, the network node may provide an implicit indication for the case of BFR. The network node may link a PRACH resource configured for BFR to the repetition of the CFRA Msg3. When the configured PRACH resource belongs to the subset of PRACH resources reserved for indicating a CBRA Msg3 repetition request/capability, the UE may perform the CBRA Msg3 repetition during BFR. When the configured PRACH resource does not belong to the subset of PRACH resources reserved for indicating the CBRA Msg3 repetition request/capability, the UE may not perform the CBRA Msg3 repetition during BFR. The network node may indicate, to the UE, the linking between the PRACH resource configured for BFR and the repetition of the CFRA Msg3 via RRC signaling, a medium access control control element (MAC-CE), or DCI.

As indicated above, FIG. 8 is provided as an example. Other examples may differ from what is described with regard to FIG. 8.

Figure 9:
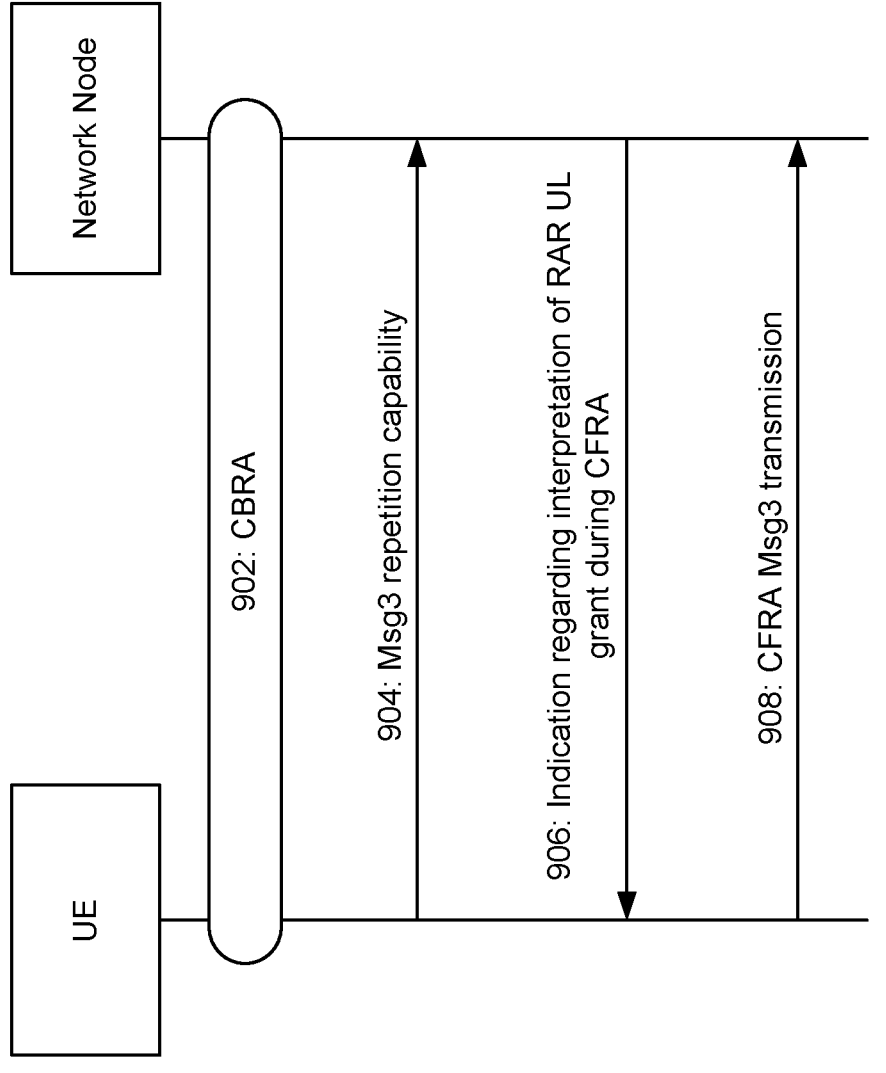

FIG. 9 is a diagram illustrating an example 900 associated with uplink transmissions with repetition during contention-free random access, in accordance with the present disclosure. As shown in FIG. 9, example 900 includes communication between a UE (e.g., UE 120) and a network node (e.g., network node 110). In some aspects, the UE and the network node may be included in a wireless network, such as wireless network 100.

As shown by reference number 902, the UE and the network node may perform a CBRA. As shown by reference number 904, the UE may report, to the network node, a Msg3 repetition capability (e.g., via a pusch-Repetition-CRC-r17). The network node may receive the Msg3 repetition capability from the UE. As shown by reference number 906, the network node may transmit, to the UE, an explicit indication associated with interpreting an RAR (e.g., an RAR uplink grant) during a CFRA between the UE and the network node. The explicit indication may indicate whether or not the UE should repeat a CFRA Msg3 transmission, which may be transmitted by the UE based at least in part on the RAR. The network node may transmit the explicit indication via a scheduling DCI associated with the RAR, a CSI request bit in the RAR, or a PDCCH order. As shown by reference number 908, the UE may transmit, to the network node, the CFRA Msg3 transmission based at least in part on the explicit indication and the RAR. For example, the UE may transmit the CFRA Msg3 transmission with repetition based at least in part on the explicit indication and the RAR.

In some aspects, regarding a UE behavior, when the UE has reported its Msg3 repetition capability, the UE may interpret the RAR uplink grant based at least in part on the explicit indication received from the network node. Otherwise, the UE may interpret the RAR uplink grant as if there is no CFRA Msg3 repetition indication. In some aspects, regarding a network node behavior, when the UE has reported its Msg3 repetition capability, the network node may determine whether CFRA Msg3 repetition is needed. When the CFRA Msg3 repetition is needed (e.g., due to poor channel conditions), the network node may transmit the explicit indication to the UE, which may indicate a UE interpretation for the RAR uplink grant (e.g., the explicit indication may indicate how the UE should interpret the RAR uplink grant). When the UE has not reported the Msg3 repetition capability, the network node may not transmit the explicit indication to the UE.

As indicated above, FIG. 9 is provided as an example. Other examples may differ from what is described with regard to FIG. 9.

Figure 10:
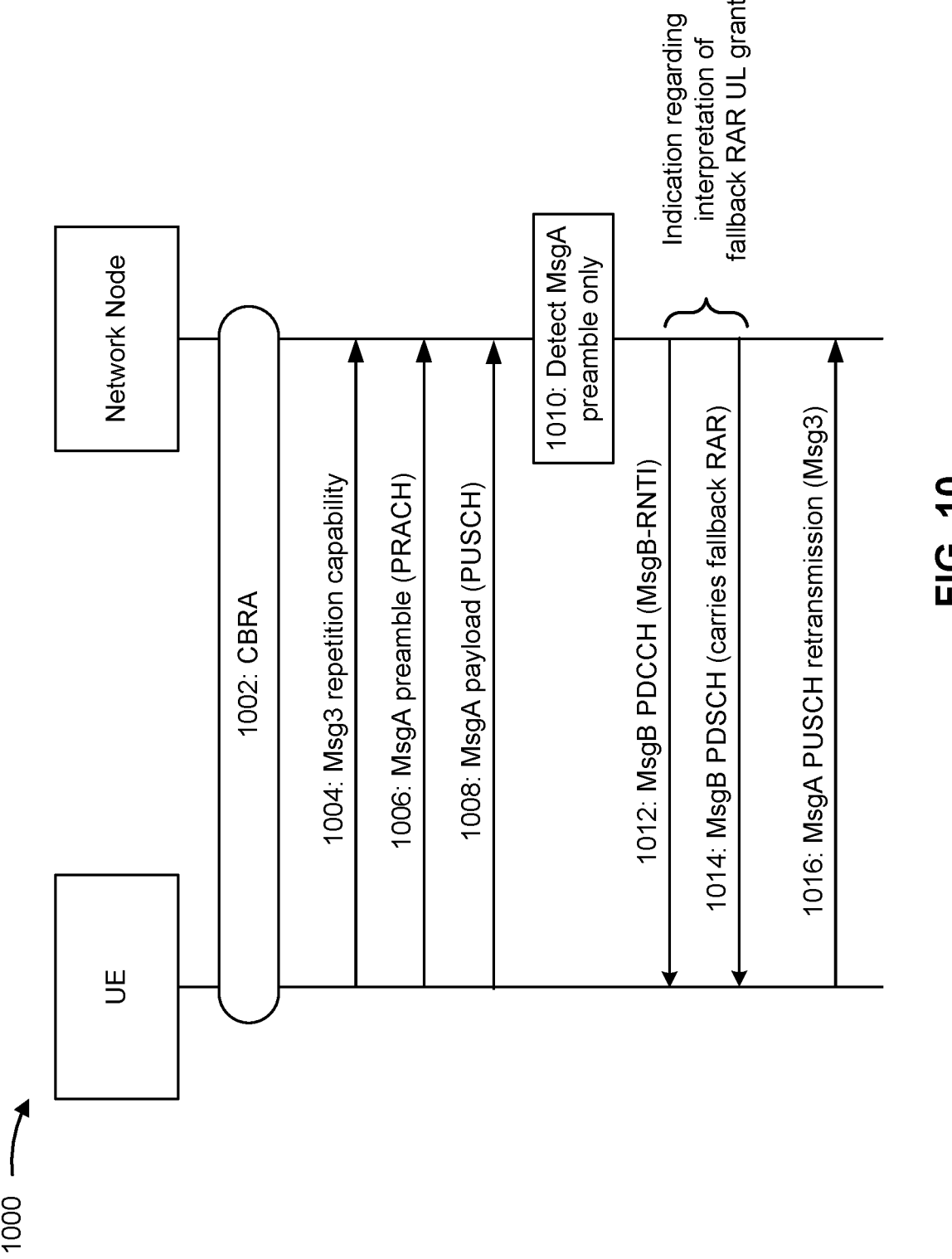

FIG. 10 is a diagram illustrating an example 1000 associated with uplink transmissions with repetition during contention-free random access, in accordance with the present disclosure. As shown in FIG. 10, example 1000 includes communication between a UE (e.g., UE 120) and a network node (e.g., network node 110). In some aspects, the UE and the network node may be included in a wireless network, such as wireless network 100.

As shown by reference number 1002, the UE and the network node may perform a CBRA. As shown by reference number 1004, the UE may report, to the network node, a Msg3 repetition capability (e.g., via a pusch-Repetition-CRC-r17). As shown by reference number 1006, the UE may transmit, to the network node, a MsgA preamble via a PRACH. As shown by reference number 1008, the UE may transmit, to the network node, a MsgA payload via a PUSCH. As shown by reference number 1010, the network node may detect the MsgA preamble (e.g., the network node may only detect the MsgA preamble). As shown by reference number 1012, the network node may transmit, to the UE, a MsgB PDCCH, which may be associated with a MsgB RNTI. As shown by reference number 1014, the network node may transmit, to the UE, a MsgB PDSCH, which may carry a fallback RAR. The network node may use the MsgB PDCCH and the MsgB PDSCH to provide an explicit indication, to the UE, regarding a UE interpretation of the fallback RAR (e.g., via a scheduling DCI associated with the RAR, or a CSI request bit in the RAR). As shown by reference number 1016, the UE may transmit, to the network node, a MsgA PUSCH retransmission (Msg3 in a two-step RACH) based at least in part on the fallback RAR and the explicit indication.

As indicated above, FIG. 10 is provided as an example. Other examples may differ from what is described with regard to FIG. 10.

FIG. 11 is a diagram illustrating an example process 1100 performed, for example, by a UE, in accordance with the present disclosure. Example process 1100 is an example where the UE (e.g., UE 120) performs operations associated with uplink transmissions with repetition during contention-free random access.

As shown in FIG. 11, in some aspects, process 1100 may include receiving, from a network node, a downlink communication that indicates an RAR or a fallback RAR, the downlink communication being received during a CFRA involving the UE and the network node (block 1110). For example, the UE (e.g., using reception component 1302, depicted in FIG. 13) may receive, from a network node, a downlink communication that indicates an RAR or a fallback RAR, the downlink communication being received during a CFRA involving the UE and the network node, as described above.

As further shown in FIG. 11, in some aspects, process 1100 may include transmitting, to the network node and based at least in part on an uplink grant in the RAR or in the fallback RAR, an uplink transmission with a repetition, the uplink transmission with the repetition being transmitted during the CFRA involving the UE and the network node (block 1120). For example, the UE (e.g., using transmission component 1304, depicted in FIG. 13) may transmit, to the network node and based at least in part on an uplink grant in the RAR or in the fallback RAR, an uplink transmission with a repetition, the uplink transmission with the repetition being transmitted during the CFRA involving the UE and the network node, as described above.

Process 1100 may include additional aspects, such as any single aspect or any combination of aspects described below and/or in connection with one or more other processes described elsewhere herein.

In a first aspect, the uplink transmission is a Msg3 of the CFRA, and the CFRA is based at least in part on a four-step random access.

In a second aspect, alone or in combination with the first aspect, the uplink transmission is a MsgA uplink retransmission of the CFRA, and the CFRA is based at least in part on a two-step random access.

25                                                             26

In a third aspect, alone or in combination with one or more of the first and second aspects, the repetition of the uplink transmission in the CFRA corresponds to a repetition of an uplink transmission in a prior CBRA between the UE and the network node, based at least in part on the RAR or the fallback RAR associated with the CFRA being interpreted similarly as an RAR associated with the CBRA.

In a fourth aspect, alone or in combination with one or more of the first through third aspects, process 1100 includes transmitting, to the network node, an uplink transmission repetition capability that indicates a UE capability for repeating the uplink transmission, wherein the RAR or the fallback RAR is interpreted for uplink transmission repetition based at least in part on the uplink transmission repetition capability signaled to the network node.

In a fifth aspect, alone or in combination with one or more of the first through fourth aspects, process 1100 includes receiving, from the network node, an indication associated with interpreting the RAR or the fallback RAR, wherein the indication indicates a repetition factor to be associated with the uplink transmission that is based at least in part on the RAR or the fallback RAR.

In a sixth aspect, alone or in combination with one or more of the first through fifth aspects, the indication is received using reserved bits in a scheduling DCI in the RAR or in the fallback RAR.

In a seventh aspect, alone or in combination with one or more of the first through sixth aspects, the indication is received using reserved bits in a CSI request bit in the RAR or in the fallback RAR.

In an eighth aspect, alone or in combination with one or more of the first through seventh aspects, the indication is received using reserved bits in a PDCCH order based at least in part on the uplink transmission with the repetition being a PDCCH order initiated uplink transmission.

In a ninth aspect, alone or in combination with one or more of the first through eighth aspects, the indication is received in a handover command based at least in part on a CFRA-based handover involving the UE.

In a tenth aspect, alone or in combination with one or more of the first through ninth aspects, the indication is received in a Msg2 of the CFRA, and the CFRA is based at least in part on a four-step random access.

In an eleventh aspect, alone or in combination with one or more of the first through tenth aspects, the indication is received in a MsgB of the CFRA, and the CFRA is based at least in part on a two-step random access.

In a twelfth aspect, alone or in combination with one or more of the first through eleventh aspects, the uplink transmission with the repetition is transmitted during a BFR based at least in part on a configured PRACH resource for the BFR being associated with a subset of PRACH resources reserved for indicating a CBRA uplink transmission request or capability.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a network node, in accordance with the present disclosure. Example process 1200 is an example where the network node (e.g., network node 110) performs operations associated with uplink transmissions with repetition during contention-free random access.

As shown in FIG. 12, in some aspects, process 1200 may include transmitting, to a UE, a downlink communication that indicates an RAR or a fallback RAR, the downlink communication being received during a CFRA involving the UE and the network node (block 1210). For example, the network node (e.g., using transmission component 1404, depicted in FIG. 14) may transmit, to a UE, a downlink communication that indicates an RAR or a fallback RAR, the downlink communication being received during a CFRA involving the UE and the network node, as described above.

As further shown in FIG. 12, in some aspects, process 1200 may include receiving, from the UE and based at least in part on an uplink grant in the RAR or in the fallback RAR, an uplink transmission with a repetition, the uplink transmission with the repetition being transmitted during the CFRA involving the UE and the network node (block 1220). For example, the network node (e.g., using reception component 1402, depicted in FIG. 14) may receive, from the UE and based at least in part on an uplink grant in the RAR or in the fallback RAR, an uplink transmission with a repetition, the uplink transmission with the repetition being transmitted during the CFRA involving the UE and the network node, as described above.

Process 1200 may include additional aspects, such as any single aspect or any combination of aspects described below and/or in connection with one or more other processes described elsewhere herein.

In a first aspect, the uplink transmission is a Msg3 of the CFRA, and the CFRA is based at least in part on a four-step random access.

In a second aspect, alone or in combination with the first aspect, the uplink transmission is a MsgA uplink retransmission of the CFRA, and the CFRA is based at least in part on a two-step random access.

In a third aspect, alone or in combination with one or more of the first and second aspects, the repetition of the uplink transmission in the CFRA corresponds to a repetition of an uplink transmission in a prior CBRA between the UE and the network node, based at least in part on the RAR or the fallback RAR associated with the CFRA being interpreted similarly as an RAR associated with the CBRA.

In a fourth aspect, alone or in combination with one or more of the first through third aspects, process 1200 includes receiving, from the UE, an uplink transmission repetition capability that indicates a UE capability for repeating the uplink transmission.

In a fifth aspect, alone or in combination with one or more of the first through fourth aspects, process 1200 includes transmitting, to the UE, an indication associated with interpreting the RAR or the fallback RAR, wherein the indication indicates a repetition factor to be associated with the uplink transmission that is based at least in part on the RAR or the fallback RAR.

In a sixth aspect, alone or in combination with one or more of the first through fifth aspects, the indication is transmitted using reserved bits in a scheduling DCI in the RAR or in the fallback RAR.

In a seventh aspect, alone or in combination with one or more of the first through sixth aspects, the indication is transmitted using reserved bits in a CSI request bit in the RAR or in the fallback RAR.

In an eighth aspect, alone or in combination with one or more of the first through seventh aspects, the indication is transmitted using reserved bits in a PDCCH order based at least in part on the uplink transmission with the repetition being a PDCCH order initiated uplink transmission.

In a ninth aspect, alone or in combination with one or more of the first through eighth aspects, the indication is transmitted in a handover command based at least in part on a CFRA-based handover involving the UE.

In a tenth aspect, alone or in combination with one or more of the first through ninth aspects, the indication is transmitted in a Msg2 of the CFRA, and the CFRA is based at least in part on a four-step random access.

In an eleventh aspect, alone or in combination with one or more of the first through tenth aspects, the indication is transmitted in a MsgB of the CFRA, and the CFRA is based at least in part on a two-step random access.

In a twelfth aspect, alone or in combination with one or more of the first through eleventh aspects, the uplink transmission with the repetition is transmitted during a BFR based at least in part on a configured PRACH resource for the BFR being associated with a subset of PRACH resources reserved for indicating a contention-based random access uplink transmission request or capability.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
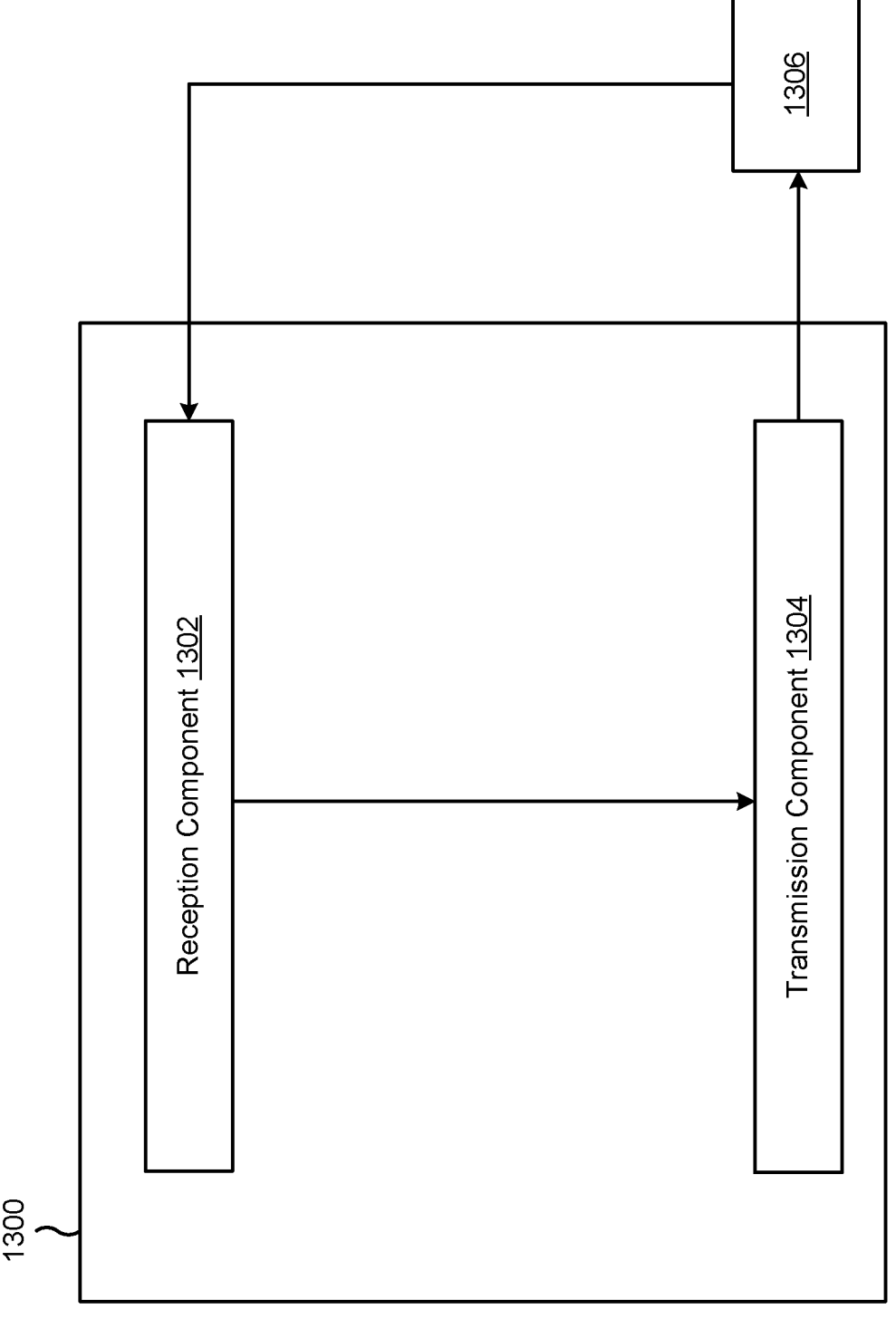
FIGS. 13-14 are diagrams of example apparatuses for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304.

In some aspects, the apparatus 1300 may be configured to perform one or more operations described herein in connection with FIGS. 8-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive, from a network node, a downlink communication that indicates an RAR or a fallback RAR, the downlink communication being received during a CFRA involving the UE and the network node. The transmission component 1304 may transmit, to the network node and based at least in part on an uplink grant in the RAR or in the fallback RAR, an uplink transmission with a repetition, the uplink transmission with the repetition being transmitted during the CFRA involving the UE and the network node.

The transmission component 1304 may transmit, to the network node, an uplink transmission repetition capability that indicates a UE capability for repeating the uplink transmission, wherein the RAR or the fallback RAR is interpreted for uplink transmission repetition based at least in part on the uplink transmission repetition capability signaled to the network node. The reception component 1302 may receive, from the network node, an indication associated with interpreting the RAR or the fallback RAR, wherein the indication indicates a repetition factor to be associated with the uplink transmission that is based at least in part on the RAR or the fallback RAR.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
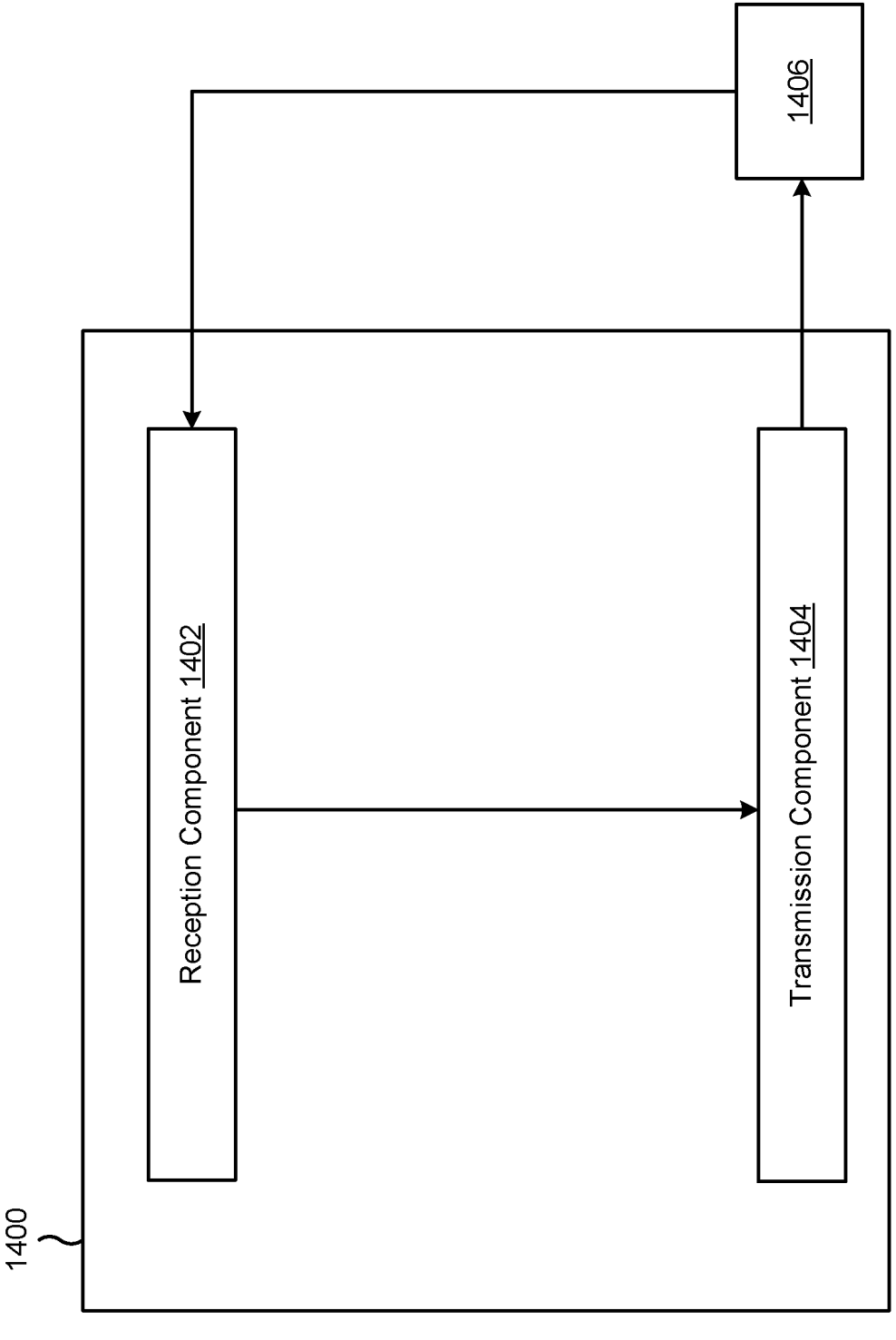

FIG. 14 is a diagram of an example apparatus 1400 for wireless communication, in accordance with the present disclosure. The apparatus 1400 may be a network node, or a network node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404.

In some aspects, the apparatus 1400 may be configured to perform one or more operations described herein in connection with FIGS. 8-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network node described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network node described in connection with FIG. 2. In some aspects, the transmission component 1404 may be co-located with the reception component 1402 in a transceiver.

The transmission component 1404 may transmit, to a UE, a downlink communication that indicates an RAR or a fallback RAR, the downlink communication being received during a CFRA involving the UE and the network node. The reception component 1402 may receive, from the UE and based at least in part on an uplink grant in the RAR or in the fallback RAR, an uplink transmission with a repetition, the uplink transmission with the repetition being transmitted during the CFRA involving the UE and the network node.

The reception component 1402 may receive, from the UE, an uplink transmission repetition capability that indicates a UE capability for repeating the uplink transmission. The transmission component 1404 may transmit, to the UE, an indication associated with interpreting the RAR or the fallback RAR, wherein the indication indicates a repetition factor to be associated with the uplink transmission that is based at least in part on the RAR or the fallback RAR.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving, from a network node, a downlink communication that indicates a random access response (RAR) or a fallback RAR, the downlink communication being received during a contention-free random access (CFRA) involving the UE and the network node; and transmitting, to the network node and based at least in part on an uplink grant in the RAR or in the fallback RAR, an uplink transmission with a repetition, the uplink transmission with the repetition being transmitted during the CFRA involving the UE and the network node.

Aspect 2: The method of Aspect 1, wherein the uplink transmission is a message 3 (Msg3) of the CFRA, and wherein the CFRA is based at least in part on a four-step random access.

Aspect 3: The method of any of Aspects 1-2, wherein the uplink transmission is a message A (MsgA) uplink retransmission of the CFRA, and wherein the CFRA is based at least in part on a two-step random access.

Aspect 4 The method of any of Aspects 1-3, wherein the repetition of the uplink transmission in the CFRA corresponds to a repetition of an uplink transmission in a prior contention-based random access (CBRA) between the UE and the network node, based at least in part on the RAR or the fallback RAR associated with the CFRA being interpreted similarly as an RAR associated with the CBRA.

Aspect 5: The method of any of Aspects 1-4, further comprising: transmitting, to the network node, an uplink transmission repetition capability that indicates a UE capability for repeating the uplink transmission, wherein the RAR or the fallback RAR is interpreted for uplink transmission repetition based at least in part on the uplink transmission repetition capability signaled to the network node.

Aspect 6: The method of any of Aspects 1-5, further comprising: receiving, from the network node, an indication associated with interpreting the RAR or the fallback RAR, wherein the indication indicates a repetition factor to be associated with the uplink transmission that is based at least in part on the RAR or the fallback RAR.

Aspect 7: The method of Aspect 6, wherein the indication is received using reserved bits in a scheduling downlink control information in the RAR or in the fallback RAR.

Aspect 8: The method of Aspect 6, wherein the indication is received using reserved bits in a channel state information request bit in the RAR or in the fallback RAR.

Aspect 9: The method of Aspect 6, wherein the indication is received using reserved bits in a physical downlink control channel (PDCCH) order based at least in part on the uplink transmission with the repetition being a PDCCH order initiated uplink transmission.

Aspect 10: The method of Aspect 6, wherein the indication is received in a handover command based at least in part on a CFRA-based handover involving the UE.

Aspect 11: The method of Aspect 6, wherein the indication is received in a message 2 (Msg2) of the CFRA, and wherein the CFRA is based at least in part on a four-step random access.

Aspect 12: The method of Aspect 6, wherein the indication is received in a message B (MsgB) of the CFRA, and wherein the CFRA is based at least in part on a two-step random access.

Aspect 13: The method of any of Aspects 1-12, wherein the uplink transmission with the repetition is transmitted during a beam failure recovery (BFR) based at least in part on a configured physical random access channel (PRACH) resource for the BFR being associated with a subset of PRACH resources reserved for indicating a contention-based random access uplink transmission request or capability.

Aspect 14: A method of wireless communication performed by a network node, comprising: transmitting, to a user equipment (UE), a downlink communication that indicates a random access response (RAR) or a fallback RAR, the downlink communication being received during a contention-free random access (CFRA) involving the UE and the network node; and receiving, from the UE and based at least in part on an uplink grant in the RAR or in the fallback RAR, an uplink transmission with a repetition, the uplink transmission with the repetition being transmitted during the CFRA involving the UE and the network node.

Aspect 15: The method of Aspect 14, wherein the uplink transmission is a message 3 (Msg3) of the CFRA, and wherein the CFRA is based at least in part on a four-step random access.

Aspect 16: The method of any of Aspects 14-15, wherein the uplink transmission is a message A (MsgA) uplink retransmission of the CFRA, and wherein the CFRA is based at least in part on a two-step random access.

Aspect 17: The method of any of Aspects 14-16, wherein the repetition of the uplink transmission in the CFRA corresponds to a repetition of an uplink transmission in a prior contention-based random access (CBRA) between the UE and the network node, based at least in part on the RAR or the fallback RAR associated with the CFRA being interpreted similarly as an RAR associated with the CBRA.

Aspect 18: The method of any of Aspects 14-17, further comprising: receiving, from the UE, an uplink transmission repetition capability that indicates a UE capability for repeating the uplink transmission.

Aspect 19: The method of any of Aspects 14-18, further comprising: transmitting, to the UE, an indication associated with interpreting the RAR or the fallback RAR, wherein the indication indicates a repetition factor to be associated with the uplink transmission that is based at least in part on the RAR or the fallback RAR.

Aspect 20: The method of Aspect 19, wherein the indication is transmitted using reserved bits in a scheduling downlink control information in the RAR or in the fallback RAR.

Aspect 21: The method of Aspect 19, wherein the indication is transmitted using reserved bits in a channel state information request bit in the RAR or in the fallback RAR.

Aspect 22: The method of Aspect 19, wherein the indication is transmitted using reserved bits in a physical downlink control channel (PDCCH) order based at least in part on the uplink transmission with the repetition being a PDCCH order initiated uplink transmission.

Aspect 23: The method of Aspect 19, wherein the indication is transmitted in a handover command based at least in part on a CFRA-based handover involving the UE.

Aspect 24: The method of Aspect 19, wherein the indication is transmitted in a message 2 (Msg2) of the CFRA, and wherein the CFRA is based at least in part on a four-step random access.

Aspect 25: The method of Aspect 19, wherein the indication is transmitted in a message B (MsgB) of the CFRA, and wherein the CFRA is based at least in part on a two-step random access.

Aspect 26: The method of any of Aspects 14-25, wherein the uplink transmission with the repetition is transmitted during a beam failure recovery (BFR) based at least in part on a configured physical random access channel (PRACH) resource for the BFR being associated with a subset of PRACH resources reserved for indicating a contention-based random access uplink transmission request or capability.

Aspect 27: An apparatus for wireless communication at a device, comprising a processor; memory coupled with the processor; and instructions stored in the memory and executable by the processor to cause the apparatus to perform the method of one or more of Aspects 1-13.

Aspect 28: A device for wireless communication, comprising a memory and one or more processors coupled to the memory, the one or more processors configured to perform the method of one or more of Aspects 1-13.

Aspect 29: An apparatus for wireless communication, comprising at least one means for performing the method of one or more of Aspects 1-13.

Aspect 30: A non-transitory computer-readable medium storing code for wireless communication, the code comprising instructions executable by a processor to perform the method of one or more of Aspects 1-13.

Aspect 31: A non-transitory computer-readable medium storing a set of instructions for wireless communication, the set of instructions comprising one or more instructions that, when executed by one or more processors of a device, cause the device to perform the method of one or more of Aspects 1-13.

Aspect 32: An apparatus for wireless communication at a device, comprising a processor; memory coupled with the processor; and instructions stored in the memory and executable by the processor to cause the apparatus to perform the method of one or more of Aspects 14-26.

Aspect 33: A device for wireless communication, comprising a memory and one or more processors coupled to the memory, the one or more processors configured to perform the method of one or more of Aspects 14-26.

Aspect 34: An apparatus for wireless communication, comprising at least one means for performing the method of one or more of Aspects 14-26.

Aspect 35: A non-transitory computer-readable medium storing code for wireless communication, the code comprising instructions executable by a processor to perform the method of one or more of Aspects 14-26.

Aspect 36: A non-transitory computer-readable medium storing a set of instructions for wireless communication, the set of instructions comprising one or more instructions that, when executed by one or more processors of a device, cause the device to perform the method of one or more of Aspects 14-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors coupled to the one or more memories, the one or more processors individually or collectively configured to:
      receive, from a network node and during a contention-free random access (CFRA) involving the UE and the network node, a downlink communication that indicates a random access response (RAR) or a fallback RAR; and
      transmit, to the network node during the CFRA and based at least in part on an uplink grant in the RAR or in the fallback RAR, an uplink transmission with a repetition, wherein a same repetition factor is used for the uplink transmission during the CFRA as a prior contention-based random access (CBRA) transmission between the UE and the network node.

2. The apparatus of claim 1, wherein the uplink transmission is a message 3 (Msg3) of the CFRA, and wherein the CFRA is based at least in part on a four-step random access.

3. The apparatus of claim 1, wherein the uplink transmission is a message A (MsgA) uplink retransmission of the CFRA, and wherein the CFRA is based at least in part on a two-step random access.

4. The apparatus of claim 1, wherein the one or more processors are further individually or collectively configured to interpret the RAR or the fallback RAR associated with the CFRA in a same manner as an RAR associated with the CBRA.

5. The apparatus of claim 1, wherein the one or more processors are further individually or collectively configured to:
   transmit, to the network node, an uplink transmission repetition capability that indicates a UE capability for repeating the uplink transmission, wherein the RAR or the fallback RAR is interpreted for uplink transmission repetition based at least in part on the uplink transmission repetition capability signaled to the network node.

6. The apparatus of claim 1, wherein the one or more processors are further individually or collectively configured to:
   receive, from the network node, an indication associated with interpreting the RAR or the fallback RAR, wherein the indication indicates the repetition factor to be used for the uplink transmission.

7. The apparatus of claim 6, wherein the one or more processors, to receive the indication, are individually or collectively configured to:
   receive the indication using reserved bits in a scheduling downlink control information in the RAR or in the fallback RAR.

8. The apparatus of claim 6, wherein the one or more processors, to receive the indication, are individually or collectively configured to:

receive the indication using reserved bits in a channel state information request bit in the RAR or in the fallback RAR.

9. The apparatus of claim 6, wherein the one or more processors, to receive the indication, are individually or collectively configured to:

receive the indication using reserved bits in a physical downlink control channel (PDCCH) order message based at least in part on the uplink transmission with the repetition being a PDCCH order initiated uplink transmission.

10. The apparatus of claim 6, wherein the one or more processors, to receive the indication, are individually or collectively configured to:

receive the indication in a handover command based at least in part on a CFRA-based handover involving the UE.

11. The apparatus of claim 6, wherein the one or more processors, to receive the indication, are individually or collectively configured to:

receive the indication in a message 2 (Msg2) of the CFRA, wherein the CFRA is based at least in part on a four-step random access.

12. The apparatus of claim 6, wherein the one or more processors, to receive the indication, are individually or collectively configured to:

receive the indication in a message B (MsgB) of the CFRA, wherein the CFRA is based at least in part on a two-step random access.

13. The apparatus of claim 1, wherein the one or more processors, to transmit the uplink transmission with the repetition, are individually or collectively configured to:

transmit the uplink transmission with the repetition during a beam failure recovery (BFR) based at least in part on a configured physical random access channel (PRACH) resource for the BFR being associated with a subset of PRACH resources reserved for indicating a contention-based random access uplink transmission request or capability.

14. An apparatus for wireless communication at a network node, comprising:

one or more memories; and one or more processors coupled to the one or more memories, the one or more processors individually or collectively configured to:

transmit, to a user equipment (UE) and during a contention-free random access (CFRA) involving the UE and the network node, a downlink communication that indicates a random access response (RAR) or a fallback RAR; and receive, from the UE during the CFRA and based at least in part on an uplink grant in the RAR or in the fallback RAR, an uplink transmission with a repetition, wherein a same repetition factor is used for the uplink transmission during the CFRA as a prior contention-based random access (CBRA) transmission between the UE and the network node.

15. The apparatus of claim 14, wherein the one or more processors are further individually or collectively configured to:

receive, from the UE, an uplink transmission repetition capability that indicates a UE capability for repeating the uplink transmission.

16. The apparatus of claim 14, wherein the one or more processors are further individually or collectively configured to:

transmit, to the UE, an indication associated with interpreting the RAR or the fallback RAR, wherein the indication indicates the repetition factor to be used for the uplink transmission.

17. The apparatus of claim 16, wherein the one or more processors, to transmit the indication, are individually or collectively configured to:

transmit the indication using reserved bits in a scheduling downlink control information in the RAR or in the fallback RAR;

transmit the indication using reserved bits in a channel state information request bit in the RAR or in the fallback RAR;

transmit the indication using reserved bits in a physical downlink control channel (PDCCH) order message based at least in part on the uplink transmission with the repetition being a PDCCH order initiated uplink transmission; or transmit the indication in a handover command based at least in part on a CFRA-based handover involving the UE.

18. The apparatus of claim 16, wherein the one or more processors, to transmit the indication, are individually or collectively configured to:

transmit the indication in a message 2 (Msg2) of the CFRA, wherein the CFRA is based at least in part on a four-step random access; or transmit the indication in a message B (MsgB) of the CFRA, wherein the CFRA is based at least in part on a two-step random access.

19. A method of wireless communication performed by a user equipment (UE), comprising:

receiving, from a network node and during a contention-free random access (CFRA) involving the UE and the network node, a downlink communication that indicates a random access response (RAR) or a fallback RAR; and transmitting, to the network node during the CFRA and based at least in part on an uplink grant in the RAR or in the fallback RAR, an uplink transmission with a repetition, wherein a same repetition factor is used for the uplink transmission during the CFRA as a prior contention-based random access (CBRA) transmission between the UE and the network node.

20. The method of claim 19, wherein:

the uplink transmission is a message 3 (Msg3) of the CFRA, and wherein the CFRA is based at least in part on a four-step random access; or the uplink transmission is a message A (MsgA) uplink retransmission of the CFRA, and wherein the CFRA is based at least in part on a two-step random access.

21. The method of claim 19, further comprising:

interpreting the RAR or the fallback RAR associated with the CFRA in a similar manner as an RAR associated with the CBRA.

22. The method of claim 19, further comprising:

transmitting, to the network node, an uplink transmission repetition capability that indicates a UE capability for repeating the uplink transmission, wherein the RAR or the fallback RAR is interpreted for uplink transmission repetition based at least in part on the uplink transmission repetition capability signaled to the network node.

23. The method of claim 19, further comprising:

receiving, from the network node, an indication associated with interpreting the RAR or the fallback RAR, wherein the indication indicates the repetition factor to be used for the uplink transmission.

24. The method of claim 23, wherein:

the indication is received using reserved bits in a scheduling downlink control information in the RAR or in the fallback RAR;

the indication is received using reserved bits in a channel state information request bit in the RAR or in the fallback RAR;

the indication is received using reserved bits in a physical downlink control channel (PDCCH) order message based at least in part on the uplink transmission with the repetition being a PDCCH order initiated uplink transmission; or the indication is received in a handover command based at least in part on a CFRA-based handover involving the UE.

25. The method of claim 23, wherein:

the indication is received in a message 2 (Msg2) of the CFRA, and wherein the CFRA is based at least in part on a four-step random access; or the indication is received in a message B (MsgB) of the CFRA, and wherein the CFRA is based at least in part on a two-step random access.

26. The method of claim 19, wherein the uplink transmission with the repetition is transmitted during a beam failure recovery (BFR) based at least in part on a configured physical random access channel (PRACH) resource for the BFR being associated with a subset of PRACH resources reserved for indicating a contention-based random access uplink transmission request or capability.

27. A method of wireless communication performed by a network node, comprising:

transmitting, to a user equipment (UE) and during a contention-free random access (CFRA) involving the UE and the network node, a downlink communication that indicates a random access response (RAR) or a fallback RAR; and receiving, from the UE during the CFRA and based at least in part on an uplink grant in the RAR or in the fallback RAR, an uplink transmission with a repetition, wherein a same repetition factor is used for the uplink transmission during the CFRA as a prior contention-based random access (CBRA) transmission between the UE and the network node.

28. The method of claim 27, further comprising:

receiving, from the UE, an uplink transmission repetition capability that indicates a UE capability for repeating the uplink transmission.

29. The method of claim 27, further comprising:

transmitting, to the UE, an indication associated with interpreting the RAR or the fallback RAR, wherein the indication indicates the repetition factor to be used for the uplink transmission.

30. The method of claim 29, wherein:

the indication is transmitted using reserved bits in a scheduling downlink control information in the RAR or in the fallback RAR;

the indication is transmitted using reserved bits in a channel state information request bit in the RAR or in the fallback RAR;

the indication is transmitted using reserved bits in a physical downlink control channel (PDCCH) order message based at least in part on the uplink transmission with the repetition being a PDCCH order initiated uplink transmission; or the indication is transmitted in a handover command based at least in part on a CFRA-based handover involving the UE.

* * * * *